US012260886B2

United States Patent
Naka et al.

(10) Patent No.: US 12,260,886 B2
(45) Date of Patent: Mar. 25, 2025

(54) SUSPENSION ARM AND SLIDER CONTACT FOR MAGNETIC STORAGE DEVICE

(71) Applicant: Western Digital Technologies, Inc., San Jose, CA (US)

(72) Inventors: Kohichiroh Naka, Fujisawa (JP); Yuhsuke Matsumoto, Fujisawa (JP); Hiroto Sato, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/360,594

(22) Filed: Jul. 27, 2023

(65) Prior Publication Data

US 2025/0006222 A1    Jan. 2, 2025

Related U.S. Application Data

(60) Provisional application No. 63/523,812, filed on Jun. 28, 2023.

(51) Int. Cl.
*G11B 5/48* (2006.01)
(52) U.S. Cl.
CPC .................................. *G11B 5/4846* (2013.01)
(58) Field of Classification Search
None
See application file for complete search history.

(56) References Cited

U.S. PATENT DOCUMENTS

| | | | | |
|---|---|---|---|---|
| 5,821,494 A | * | 10/1998 | Albrecht | G11B 5/4853 228/111.5 |
| 6,198,599 B1 | * | 3/2001 | Senuma | G11B 5/486 |
| 6,351,354 B1 | * | 2/2002 | Bonin | G11B 5/4826 360/245.9 |
| 6,950,288 B2 | * | 9/2005 | Yao | G11B 5/5552 |
| 7,535,676 B2 | | 5/2009 | Lille | |
| 8,174,793 B2 | * | 5/2012 | Hasegawa | G11B 5/105 360/234.5 |
| 8,400,736 B2 | | 3/2013 | Greminger et al. | |
| 8,587,901 B1 | * | 11/2013 | Puttichaem | G11B 5/486 360/234.5 |
| 8,934,201 B1 | * | 1/2015 | Feng | G11B 5/4846 360/264.2 |
| 9,728,211 B1 | * | 8/2017 | Murata | G11B 5/4826 |
| 9,953,669 B1 | | 4/2018 | Klarqvist et al. | |

(Continued)

*Primary Examiner* — William J Klimowicz
(74) *Attorney, Agent, or Firm* — Kunzler Bean & Adamson

(57) ABSTRACT

Disclosed herein is a magnetic storage device that comprises a suspension arm co-movably fixed to a carriage arm. The suspension arm comprises a slider attachment side and at least one first electrical contact pad on the slider attachment side. The suspension arm also comprises a slider co-movably fixed to the suspension arm. The slider comprises a suspension attachment side, a non-head side facing the suspension arm and intersecting the suspension attachment side at a first slider edge of the slider, a head side facing away from the suspension arm, and at least one electrical contact component on the suspension attachment side up to the first slider edge. At least one solder weldment is directly coupled to the at least one first electrical contact pad and the at least one electrical contact component. Additionally, a read-write head is coupled to the head side of the slider.

20 Claims, 10 Drawing Sheets

(56) References Cited

U.S. PATENT DOCUMENTS

| | | | |
|---|---|---|---|
| 10,460,754 B2* | 10/2019 | Matsumoto | G11B 5/4846 |
| 10,706,880 B1* | 7/2020 | Grimm | G11B 5/4826 |
| 11,062,731 B1* | 7/2021 | Satoh | G11B 5/4826 |
| 11,355,144 B1 | 6/2022 | Stephan et al. | |
| 2003/0070834 A1* | 4/2003 | Tsuchiya | G11B 5/4853 |
| | | | 174/250 |
| 2006/0139809 A1* | 6/2006 | Matsumoto | H05K 3/3442 |
| | | | 360/234.5 |
| 2010/0321829 A1 | 12/2010 | Hutchinson et al. | |
| 2013/0063839 A1 | 3/2013 | Matsumoto et al. | |
| 2019/0122694 A1 | 4/2019 | Davidson et al. | |
| 2019/0244636 A1* | 8/2019 | Matsumoto | G11B 5/4846 |
| 2020/0098388 A1* | 3/2020 | Davidson | G11B 5/4826 |
| 2022/0375496 A1* | 11/2022 | Ng | G11B 5/4833 |
| 2023/0178105 A1* | 6/2023 | Naka | G11B 5/4853 |
| | | | 360/234.5 |

\* cited by examiner

400
SUSPENSION ARM AND SLIDER CONTACT FOR MAGNETIC STORAGE DEVICE

FIELD

This disclosure relates generally to magnetic storage devices, and more particularly to improving connections between suspension arms and sliders of read-write head assemblies of magnetic storage devices.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write head assemblies that help facilitate storage of data on magnetic disks. Each read-write head assembly may include a slider, supporting a read-write head, and a suspension arm. Reliably electrically interconnecting the slider and the suspension arm of a read-write head assembly can be difficult.

SUMMARY

A need exists for a magnetic storage device that improves connections between suspension arms and sliders of read-write head assemblies of magnetic storage devices. The subject matter of the present application has been developed in response to the present state of magnetic storage device are, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed herein is a magnetic storage device that includes a magnetic disk and a carriage arm rotatably movable relative to the magnetic disk. The magnetic storage device additionally includes a suspension arm co-movably fixed to the carriage arm. The suspension arm includes a slider attachment side and at least one first electrical contact pad on the slider attachment side. The magnetic storage device includes a slider co-movably fixed to the suspension arm. The slider includes a base having a suspension attachment side, a non-head side facing the suspension arm and intersecting the suspension attachment side at a first slider edge of the base, and a head side opposite the non-head side and facing away from the suspension arm. The suspension attachment side extends between the non-head side and the head side of the base. The slider also includes at least one second electrical contact pad attached to the suspension attachment side of the base. The second electrical contact pad includes a first portion on the suspension attachment side of the base and a second portion protruding from the first portion away from the suspension attachment side at an angle with respect to the first portion. The second portion has a maximum width, in a virtual plane substantially parallel to the suspension attachment side. The maximum width of the second portion is less than a maximum width of the first portion in the virtual plane. The magnetic storage device includes at least one solder weldment directly coupled to the at least one first electrical contact pad and the at least one second electrical contact pad. The magnetic storage device includes a read-write head coupled to the head side of the base. The preceding subject matter of this paragraph characterizes example 1 of the present disclosure.

The second portion of the at least one second electrical contact pad further includes a first second-portion edge and a second second-portion edge. A portion of the second portion within a hypothetical square, parallel to the suspension attachment side of the base and projected onto the slider, is less than nine-tenths of a portion of the first portion within the hypothetical square. A first side of the hypothetical square is aligned with a first side of the first portion. A second side of the hypothetical square is perpendicular to the first side and is aligned with the first second-portion edge of the second portion. A third side of the hypothetical square is parallel to the second side and is aligned with the second second-portion edge of the second portion. The preceding subject matter of this paragraph characterizes example 2 of the present disclosure, wherein example 2 also includes the subject matter according to example 1, above.

The portion of the second portion within the hypothetical square is less than half of the portion of the first portion within the hypothetical square. The preceding subject matter of this paragraph characterizes example 3 of the present disclosure, wherein example 3 also includes the subject matter according to example 2, above.

The solder weldment is further directly coupled to the first portion and the second portion of the at least one second electrical contact pad. The preceding subject matter of this paragraph characterizes example 4 of the present disclosure, wherein example 4 also includes the subject matter according to any one of examples 1-3, above.

A width of the first portion of the at least one second electrical contact pad varies along a length of the first portion. A width of the second portion of the at least one second electrical contact pad varies along a length of the second portion. The preceding subject matter of this paragraph characterizes example 5 of the present disclosure, wherein example 5 also includes the subject matter according to any of examples 1-4, above.

The width of the first portion of the at least one second electrical contact pad increases along the length of the first portion in a first direction away from the non-head side of the base. The width of the second portion of the at least one second electrical contact pad decreases along the length of the second portion in the first direction away from the non-head side of the base. The preceding subject matter of this paragraph characterizes example 6 of the present disclosure, wherein example 6 also includes the subject matter according to example 5, above.

The first portion is symmetrical. The preceding subject matter of this paragraph characterizes example 7 of the present disclosure, wherein example 7 also includes the subject matter according to any of examples 5 and 6, above.

The first portion is asymmetrical. The preceding subject matter of this paragraph characterizes example 8 of the present disclosure, wherein example 8 also includes the subject matter according to examples 5 and 6, above.

The suspension arm includes at least twelve first electrical contact pads on the slider attachment side. The at least one first electrical contact pad includes an electrical contact pad of the at least twelve first electrical contact pads. The slider includes at least twelve second electrical contact pads. The at least one second electrical contact pad includes an electrical contact pad of the at least twelve second electrical contact pads. The magnetic storage device includes at least twelve weldments each directly coupled to corresponding ones of the at least twelve first electrical contact pads and the at least twelve second electrical contact pads. The preceding subject matter of this paragraph characterizes example 9 of the present disclosure, wherein example 9 also includes the subject matter according to any one of examples 1-8 above.

The second portion further comprises a first second-portion edge and a second second-portion edge. The first second-portion edge is spaced apart from the first portion. The second second-portion edge adjoins the first portion along a bend between the first portion and the second portion. The preceding subject matter of this paragraph characterizes example 10 of the present disclosure, wherein example 10 also includes the subject matter according to any one of examples 1-9, above.

The first second-portion edge has a width, in the virtual plane, that is less than the maximum width of the second portion. A width of the second second-portion edge is equal to the maximum width of the second portion. The preceding subject matter of this paragraph characterizes example 11 of the present disclosure, wherein example 11 also includes the subject matter according to example 10, above.

The first second-portion edge is curved. The preceding subject matter of this paragraph characterizes example 12 of the present disclosure, wherein example 12 also includes the subject matter according to any examples 10 or 11, above.

The first portion includes at least one slit extending from a side of the first portion toward a center line of the first portion. The preceding subject matter of this paragraph characterizes example 13 of the present disclosure, wherein example 13 also includes the subject matter according to any one of examples 1-12, above.

Examples of the present disclosure include a read-write head assembly for a magnetic storage device. The read-write head assembly includes a suspension arm. The suspension arm includes a slider attachment side and at least one first electrical contact pad on the slider attachment side. The read-write head assembly further includes a slider co-movably fixed to the suspension arm. The slider includes a base having a suspension attachment side, a non-head side facing the suspension arm and intersecting the suspension attachment side at a first slider edge of the base, and a head side opposite the non-head side and facing away from the suspension arm. The suspension attachment side extends between the non-head side and the head side of the base. The slider includes at least one second electrical contact pad attached to the suspension attachment side of the base. The second electrical contact pad includes a first portion on the suspension attachment side of the base and a second portion protruding from the first portion away from the suspension attachment side at an angle with respect to the first portion. The second portion has a maximum width, in a virtual plane substantially parallel to the suspension attachment side. The maximum width of the second portion is less than a maximum width of the first portion in the virtual plane. The read-write head assembly includes at least one solder weldment directly coupled to the at least one first electrical contact pad and the at least one second contact pad. The read-write head assembly includes a read-write head coupled to the head side of the base. The preceding subject matter of this paragraph characterizes example 14 of the present disclosure.

The second portion has a semi-circular shape. The preceding subject matter of this paragraph characterizes example 15 of the present disclosure, wherein example 15 also includes the subject matter according to example 14, above.

The second portion has a trapezoidal shape. The preceding subject matter of this paragraph characterizes example 16 of the present disclosure, wherein example 16 also includes the subject matter according to example 14, above.

The at least one second electrical contact pad further includes an additional second portion protruding from the first portion away from the suspension attachment side at an angle with respect to the first portion. The preceding subject matter of this paragraph characterizes example 17 of the present disclosure, which also includes any of the subject matter according to any one of examples 14-16, above.

The at least one second electrical contact pad further includes an anti-wetting layer disposed over the first portion. The preceding subject matter of this paragraph characterizes example 18 of the present disclosure, wherein example 18 also includes the subject matter according to any one of examples 14-17, above.

The anti-wetting layer has a maximum width that is greater than a maximum width of the first portion. The preceding subject matter of this paragraph characterizes example 19 of the present disclosure, wherein example 19 also includes the subject matter according to example 18, above.

Examples of the present disclosure also include a method of making a magnetic storage device. The method includes forming at least one second electrical contact pad on a base of a slider so that a width of a first portion of the at least one second electrical contact pad is greater than a width of a second portion of the at least one second electrical contact pad, and the second portion protrudes from the first portion away from the base of the slider at an angle with respect to the first portion and the base of the slider. The method includes soldering at least one first electrical contact pad of a suspension arm to the at least one second electrical contact pad of the slider via at least one solder ball so that the solder ball reflows over at least part of the first portion and at least part of the second portion of the at least one second electrical contact pad. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
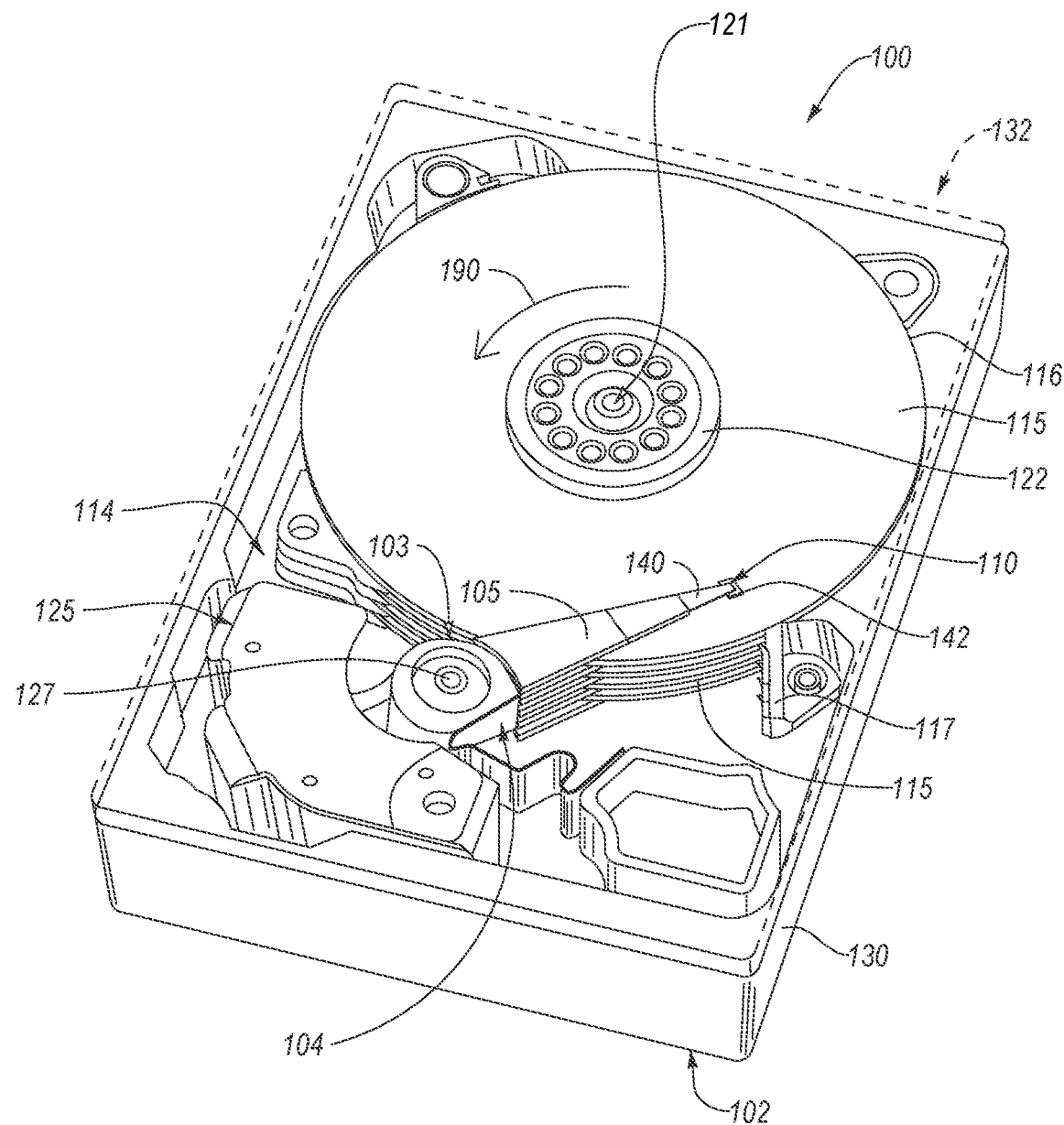
FIG. 1 is a perspective view of a magnetic storage device, according to one or more examples of the present disclosure.

Referring to FIG. 1, a magnetic storage device 100, according to one embodiment, is depicted as a hard disk drive (HDD). However, in other embodiments, the magnetic storage device 100 can be any of various magnetic storage devices without departing from the essence of the subject matter of the present disclosure. The magnetic storage device 100 includes a housing 102 that seals or encloses an interior cavity 114 defined within the housing. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a seal between the base 130 and the cover 132.

Figure 2:
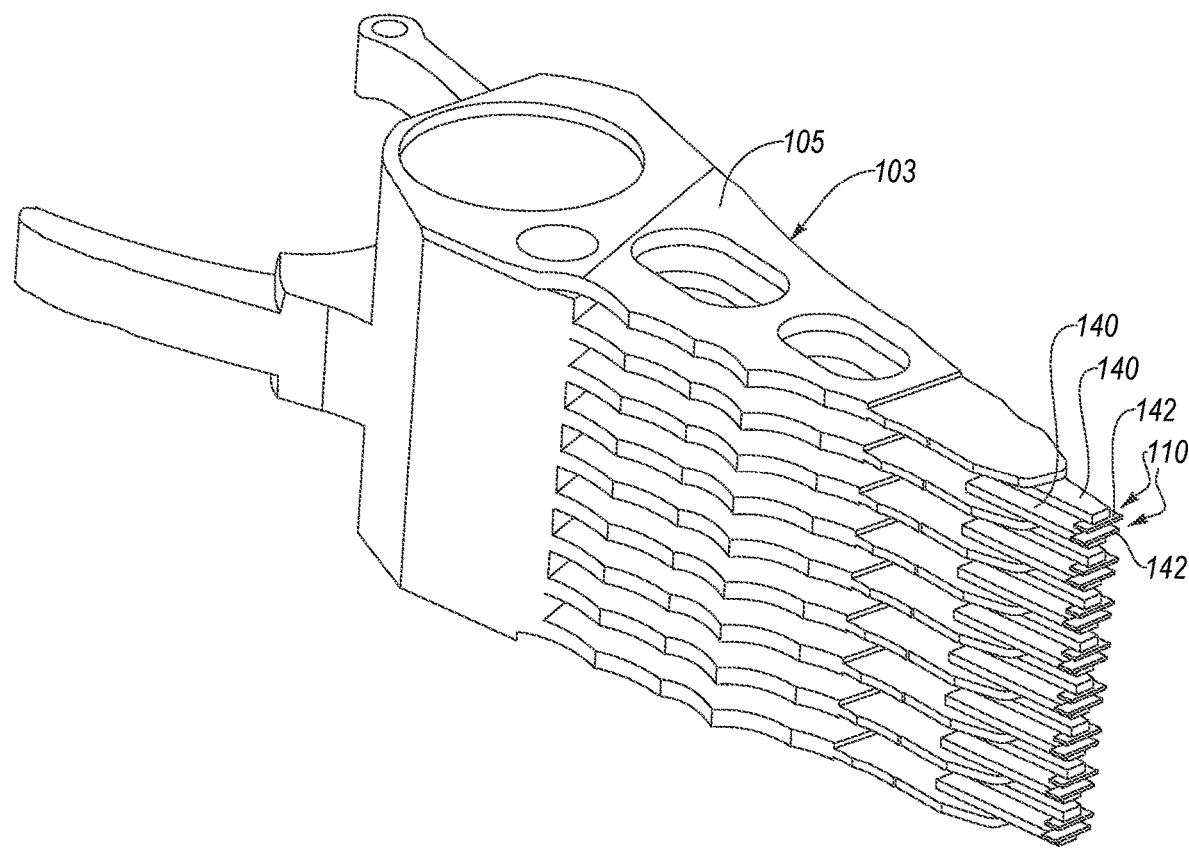
FIG. 2 is a perspective view of carriage arms, suspension arms, and sliders of a magnetic storage device, according to one or more examples of the present disclosure.

The magnetic storage device 100 includes various features located within the interior cavity 114 of the housing 102. In some embodiments, the magnetic storage device 100 includes a carriage 103, disks 115, a spindle motor 121, and a voice coil magnetic (VCM) actuator 125 within the interior cavity 114. The carriage 103 includes a plurality of carriage arms 105 and at least one read-write head assembly 110 coupled to the distal tip of each arm of the plurality of carriage arms 105. In the illustrated embodiment of FIG. 2, two read-write head assemblies 110 are coupled to the distal tip of each carriage arm of the plurality of carriage arms 105. Each read-write head assembly 110 includes a suspension arm 140, a slider 142, and at least one read-write head 148 (see, e.g., FIG. 3). Although not shown, each read-write head assembly 110 can include at least one gimbal. The gimbal movably couples the suspension arm 140, the slider 142, and the at least one read-write head 148 to a corresponding one of the carriage arms 105. Although the magnetic storage device 100 is shown to have five carriage arms 105 and four disks 115 in the embodiment of FIG. 1 and nine carriage arms 105 and eight disks 115 in the embodiment of FIG. 2, in other embodiments the magnetic storage device 100 can have fewer than five carriage arms 105, fewer than four disks 115, more than nine carriage arms 105, more than eight disks 115, between 6-8 carriage arms 105, or between 5-7 disks 115. Each side of each carriage arm 105 facing a disk 115 has a read-write head assembly 110 (e.g., in FIG. 2, each of bottom and top carriage arms 105 has one read-write head assembly 110 and each of middle carriage arms 105, between the bottom and top carriage arms 105, has two read-write head assemblies 110). Similarly, although the magnetic storage device 100 is shown to have one spindle motor 121 and one VCM actuator 125, in other embodiments, the magnetic storage device 100 can have any number of spindle motors 121 and VCM actuators 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic recording media. Generally, in one embodiment, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface 116 of the disk is substantially smooth and continuous. In one embodiment, each bit has a magnetic dipole moment that can either have an in-plane (longitudinal) orientation or an out-of-plane (perpendicular) orientation.

As the disks 115 rotate in a read-write mode, the VCM actuator 125 electromagnetically engages voice coils of the carriage arms 105 to rotate the carriage arms 105, and the read-write head assemblies 110, which are coupled to the carriage arms 105, relative to the disks 115 in a rotational direction along a plane parallel to read-write surfaces 154 of the disks 115. The carriage arms 105 can be rotated to position the read-write head 148 of the read-write head assemblies 110 over a specified radial area of the read-write surface 154 of a corresponding disk 115 for read and/or write operations. The VCM actuator 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM actuator 125.

The carriage arms 105 are non-movably fixed to and extend away from a base of the carriage 103 in a spaced-apart manner relative to each other. In some implementations, the carriage arms 105 are spaced an equi-distance apart from each other and extend parallel relative to each other. A respective one of the disks 115 is positioned between adjacent carriage arms 105. In an idle mode (e.g., when read-write operations are not being performed), the VCM actuator 125 is actuated to rotate the carriage arms 105, in a radially outward direction relative to the disks 15, such that the read-write head assemblies 110 are parked or unloaded onto a ramp support 117 secured to the base 130.

Each read-write head 148 includes at least one read transducer and at least one write transducer. The read transducer is configured to detect magnetic properties (e.g., magnetic bit patterns) of a disk 115 and convert the magnetic properties into an electrical signal. In contrast, the write transducer changes the magnetic properties of a disk 115 responsive to an electrical signal. For each read-write head assembly 110, the electrical signals are transmitted from and to the read-write head 148 via electrical traces or lines formed in or coupled to the slider 142, suspension arm 140, and carriage arm 105. The electrical traces of the slider 142, suspension arm 140, and carriage arm 105 are electrically interconnected to facilitate transmission of electrical signals between the read-write head 148 and a flex connector 104 of the magnetic storage device 100, which is in communication with a control module of the magnetic storage device 100. The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted. As is described in more detail below, solder weldments are utilized to electrically connect corresponding electrical contact pads (and corresponding electrical traces) of the slider 142 and the suspension arm 140.

Although not shown, the read-write head assembly 110 also includes a head actuator selectively operable to move the read-write head 148 relative to the carriage arm 105. The head actuator selectively moves the read-write head 148 in any of various manners and in any of various directions. For example, the head actuator can be configured to move the read-write head 148 linearly in any of various directions, such as in one or more of a first sideways direction, a second sideways direction, a forward direction, and a backward direction, along a plane parallel to the read-write surface 154 of the disk 115. As another example, the head actuator may be, alternatively or additionally, configured to move the read-write head 148 linearly in any of various directions, such as an upward direction and a downward direction, along a plane perpendicular to the read-write surface 154 of the disk 115. Further, in some implementations, the head actuator may be, alternatively or additionally, configured to move the read-write head 148 rotationally in any of various rotational directions along planes parallel to and/or perpendicular to the read-write surface 154 of the disk 115. The head actuator can be any of various actuators known in the art, such as, for example, so-called electrically-controlled micro-actuators and milli-actuators (e.g., piezo-electric actuators).

The suspension arm 140 of the read-write head assembly 110 is softer and more flexible than the carriage arm 105 to promote resilient support the slider 142 relative to the carriage arm 105. For example, in some implementations, the suspension arm 140 is flexible to flex away from the read-write surface 154 of the disk 115 to allow the slider 142 move away from the read-write surface 154 of the disk 115, such as when an air bearing is formed between the read-write surface 154 and the slider 142 as the disk 115 spins relative to the read-write head assembly 110. The suspension arm 140 can have a generally thin, sheet-like, construction and taper from carriage arm 105 to the slider 142. The slider 142 is coupled to a distal end portion of the suspension arm 140 such that the suspension arm 140 is positioned between or separates the slider 142 from the carriage arm 105. In this manner, the slider 142 is distally spaced apart from the carriage arm 105 via the suspension arm 140. The suspension arm 140 is either directly or indirectly coupled to the carriage arm 105. The suspension arm 140 can be made of any of various materials, such as metals, composites, plastics, and the like.

According to some embodiments, the suspension arm 140 is directly coupled to the carriage arm 105. In such embodiments, the suspension arm 140 is non-movably fixed to the carriage arm 105. In other words, although the suspension arm 140 may flex to move portions of the suspension arm 140 relative to the carriage arm 105, the portion of the suspension arm 140 immediately affixed to the carriage arm 105 does not move relative to the carriage arm 105. The suspension arm 140 can be non-movably fixed to the carriage arm 105 via any of various coupling techniques, such as fastening, bonding, adhering, welding, and the like.

In contrast, in certain embodiments, the suspension arm 140 is indirectly coupled to the carriage arm 105. In such embodiments, the suspension arm 140 can be non-movably fixed to carriage arm 105 or movably fixed to the carriage arm 105. According to some implementations, the suspension arm 140 is movably fixed to the carriage arm 105 via a suspension arm actuator (not shown). The suspension arm actuator movably couples a proximal end of the suspension arm 140, and thus the entire suspension arm 140, to the distal end of the carriage arm 105. The suspension arm actuator is configured to selectively move the suspension arm 140 relative to the carriage arm 105. More specifically, as an example, the suspension arm actuator selectively rotates the suspension arm 140, and thus the slider 142 relative to the carriage arm 105, in rotational directions along a plane parallel to the read-write surface 154 of the disk 115. The suspension arm actuator can be any of various actuators known in the art, such as, for example, so-called electrically-controlled micro-actuators and milli-actuators.

Figure 3:
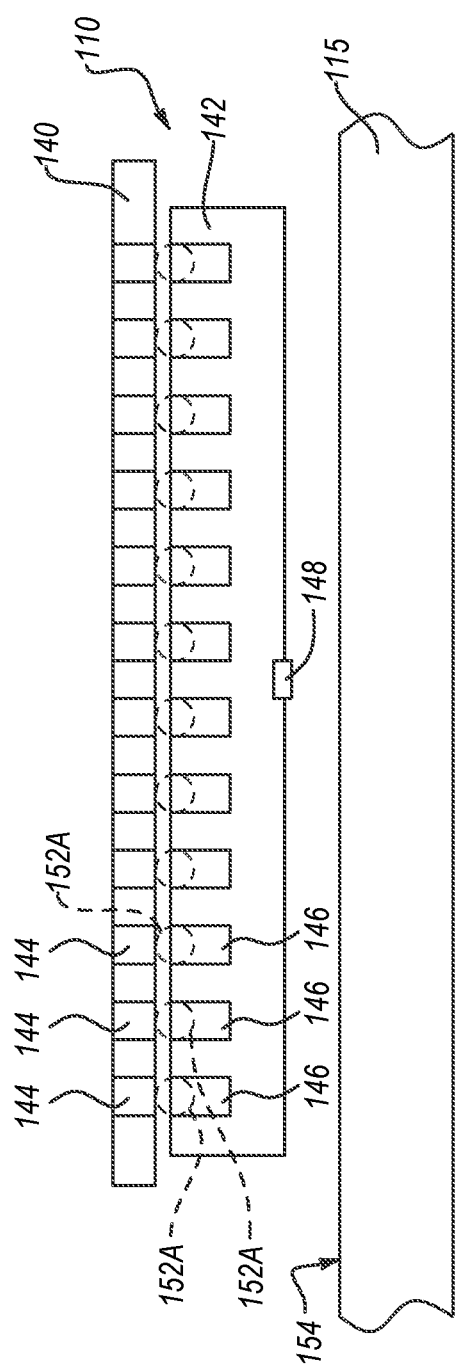
FIG. 3 is a front view of a read-write head assembly of a magnetic storage device, according to one or more examples of the present disclosure.
Figure 4A:
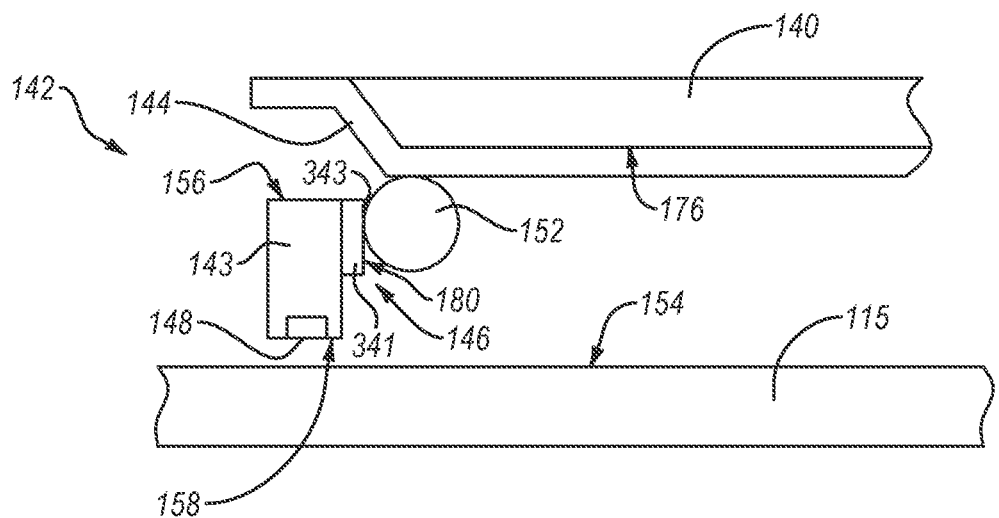
FIG. 4A is a side elevation view of a read-write head assembly of a magnetic storage device, according to one or more examples of the present disclosure.
Figure 4B:
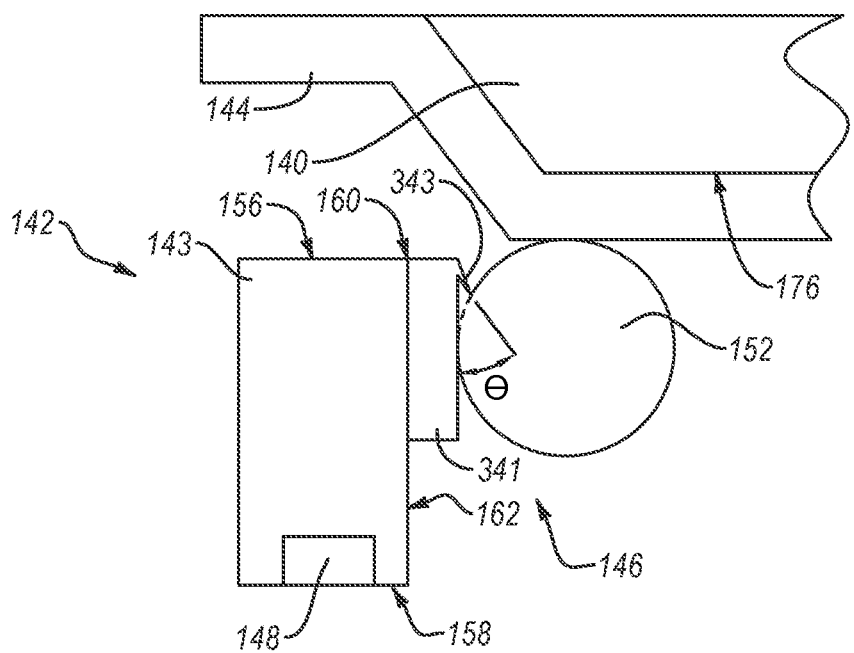
FIG. 4B is a magnified, side elevation view of the read-write head assembly of FIG. 4A, according to one or more examples of the present disclosure.

Referring to FIGS. 3-4B, the suspension arm 140 includes a slider attachment side 176 facing the read-write surface 154 of the disk 115. The suspension arm 140 may thin towards its distal end and converge to a point in some implementations such that at the distal end of the suspension arm 140 the slider attachment side 176 is angled relative to, but still faces, the read-write surface 154 of the disk 115.

Additionally, the suspension arm 140 includes at least one first electrical contact pad 144 on the slider attachment side 176. The first electrical pad 144 is located at the distal end of the suspension arm 140 and may extend along the length of the suspension arm 140 in a direction parallel with the read-write surface 154. Alternatively, the length of the first electrical pad 144 can be shorter with a narrower electrical trace electrically coupled to the first electrical pad 144 extending along the length of the suspension arm 140. As shown in FIG. 3, the suspension arm 140 includes a plurality of first electrical contact pads 144 spaced apart from each other in a direction parallel with the read-write surface 154. In one implementation, the suspension arm 140 includes at least twelve first electrical contact pads 144 spaced apart from each other. In another implementation, the suspension arm 140 includes at least fourteen first electrical contact pads 144 spaced apart from each other. The first electrical contact pad 144 can be made of any of various electrically conductive materials, such as gold, silver, copper, and the like. Moreover, the first electrical contact pad 144 can be attached to or applied onto the slider attachment side 176 of the suspension arm 140 using any of various techniques, such as adhering, bonding, printing, sputtering, and the like.

The slider 142 of the read-write head assembly 110 is configured to support the read-write head 148 at a proper flying height above the read-write surface 154. The read-write head 148 is embedded in the slider 142. Although not shown, the slider 142 may include side rails that glide along the read-write surface 154 as the disk 115 rotates relative to the read-write head assembly 110. Alternatively, the slider 142 may include complex shapes, such as a Femto slider, configured to predictably position the slider 142 above the read-write surface 154 of the disk 115. The slider 142 can be made of any of various materials, such as low friction materials. For example, in one implementation, the slider 142 is at least partially made of alumina. According to an implementation, the slider 142 is made of AlTiC and alumina, with the read/write head being embedded in the alumina. The alumina can be applied onto the AlTiC via a spattering technique in some implementations.

Referring to FIG. 4B, according to one embodiment, the slider 142 includes a base 143 with a suspension attachment side 162 that faces toward the carriage arm 105. In one implementation, the suspension attachment side 162 has a planar surface that is perpendicular to the read-write surface 154 of the disk 115. In some examples, an entirety of the suspension attachment side 162 is a planar surface that is perpendicular to the read-write surface 154. Alternatively, in other examples, the suspension attachment side 162 includes surface features, such as a bevel feature or a step feature such that some portions of the suspension attachment side 162 define surfaces that are angled more than 90-degrees relative to the read-write surface 154, such as with a bevel feature, or are parallel to the read-write surface 154, such as with a step feature.

The suspension attachment side 162 extends up to a non-head side 156 of the base 143 of the slider 142. The non-head side 156 is a side of the base 143 that does not include the read-write head 148 and faces the suspension arm 140 (e.g., faces away from the read-write surface 154). As additionally defined, the non-head side 156 is the side of the base 143 furthest away from the read-write surface 154 of the corresponding disk 115. In one implementation, the non-head side 156 of the slider 142 is generally parallel with the read-write surface 154. The slider 142 further includes a first slider edge 160 (or corner) defined at the intersection of the suspension attachment side 162 and the non-head side 156 of the base 143. In other words, the first slider edge 160 separates the suspension attachment side 162 from the non-head side 156. In some implementations, the first slider edge 160 is the edge of the base 143 furthest away from the read-write surface 154 of the corresponding disk 115. Accordingly, even when features of the suspension attachment side 162, such as a bevel feature or a step feature, define intermediate edges between the non-head side 156 and a head side 158 of the base 143, such edges are not first slider edges.

The head side 158 of the base 143 is a side of the base 143 that includes or directly supports the read-write head 148 and faces away from the suspension arm 140 (e.g., faces toward the read-write surface 154). As additionally defined, the head side 158 of the slider 142 is the side of the slider 142 closest to the read-write surface 154 of the corresponding disk 115. In one implementation, the head side 158 of the base 143 is generally parallel with the read-write surface 154.

The slider 142 further includes at least one second electrical contact pad 146 on the suspension attachment side 162 up to the first slider edge 160. In other words, while the second electrical contact pad 146 may not cover an entire height of the suspension attachment side 162, the second electrical contact pad 146 at least covers a portion of the suspension attachment side 162 up to the first slider edge 160. In this manner, in some examples, a minimum distance between the first electrical contact pad 144 of the suspension arm 140 and the non-head side 156 of the base 143 is substantially equal to or more than a minimum distance between the second electrical contact pad 146 and the non-head side 156 of the base 143. In other words, there is no gap (in a direction perpendicular to the read-write surface 154) along the suspension attachment side 162 between the first second electrical contact pad 146 and the non-head side 156 of the slider 142. Because this gap is zero, the solder weldment 152 is effectively constrained from directly contacting the non-electrical contact portions of the slider 142 and thus solder-induced open conditions are reduced.

As shown in FIG. 4B, the second electrical contact pad 146 includes a first portion 341 and a second portion 343. The first portion 341 is on the suspension attachment side 162 of the base 143. The second portion 343 is not in direct contact with the base 143. The second portion 343 may be referred to as a "burr." The second portion 343 is formed as a result of a process of forming the second electrical contact pad 146 onto the suspension attachment side 162. In other words, in some examples, the second portion 343 is a remnant of forming the second electrical contact pad 146 (specifically, the first portion 341) onto the suspension attachment side 162. As shown in FIG. 5B, the second portion 343 includes an edge 553 that is also an edge of the first portion 341. The second portion 343 protrudes from the first portion 341 away from the suspension attachment side 162 at an angle θ with respect to the first portion 341. The angle θ is greater than 0 degrees and less than, or equal to, 90 degrees. For example, the angle θ is less than 30 degrees in some implementations.

As shown in FIGS. 4A-4B, the read/write head assembly 110 includes a solder weldment 152. The solder weldment 152 is coupled directly to the first electrical contact pad 144 and the second electrical contact pad 146. As shown in FIG. 4B, the solder weldment 152 is coupled directly to both the first portion 341 and the second portion 343 of the second electrical contact pad 146. The size and shape of the second portion 343 and/or the angle θ of the second portion 343 with respect to the first portion 341 can affect the area of contact between the solder weldment 152 and the first portion 341, which also affects signal strength and connectivity between the second electrical contact pad 146 and the first electrical contact pad 144. Improving signal strength and connectivity between the second electrical contact pad 343 and the first electrical contact pad 341 also helps to improve signal strength and connectivity between the read/write head 148 and the first electrical contact pad 341. Examples of the present disclosure can promote a shape and/or a size of the second portion 343 in order to increase contact area between the first portion 341 and the solder weldment 152.

Figure 5A:
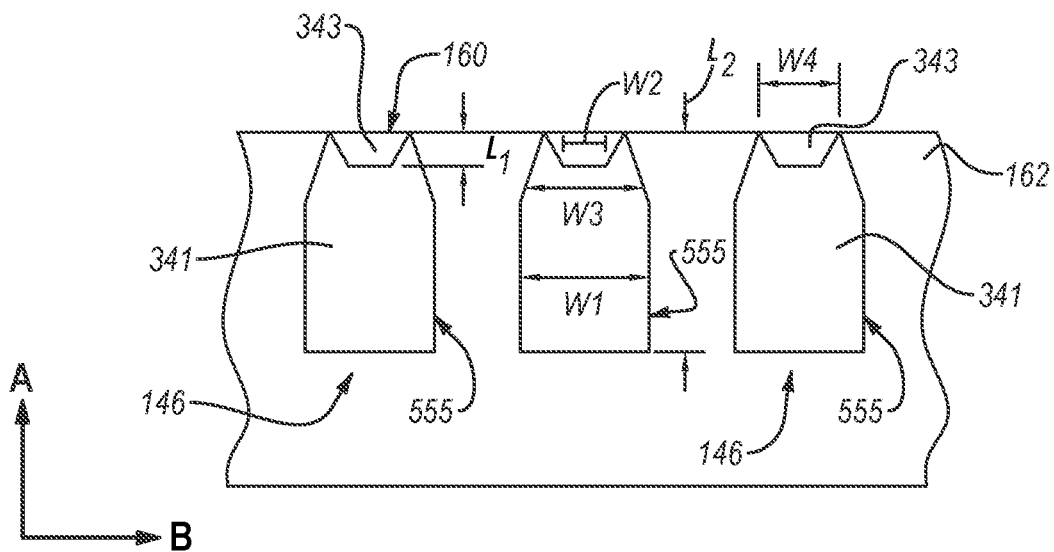
FIG. 5A is a front view of a slider of a read-write head assembly having an electrical contact pad, according to one or more examples of the present disclosure.
Figure 5B:
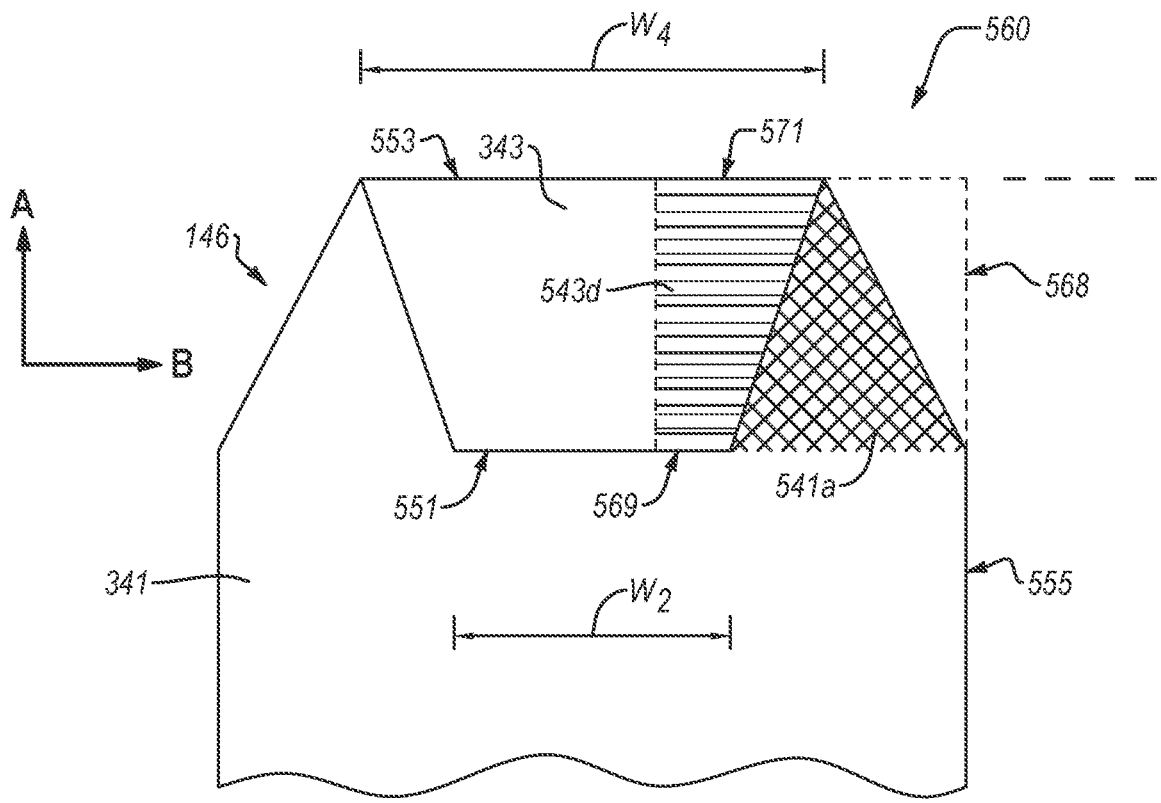
FIG. 5B is a magnified, front view of the slider of FIG. 5A, according to one or more examples of the present disclosure.
Figure 6:
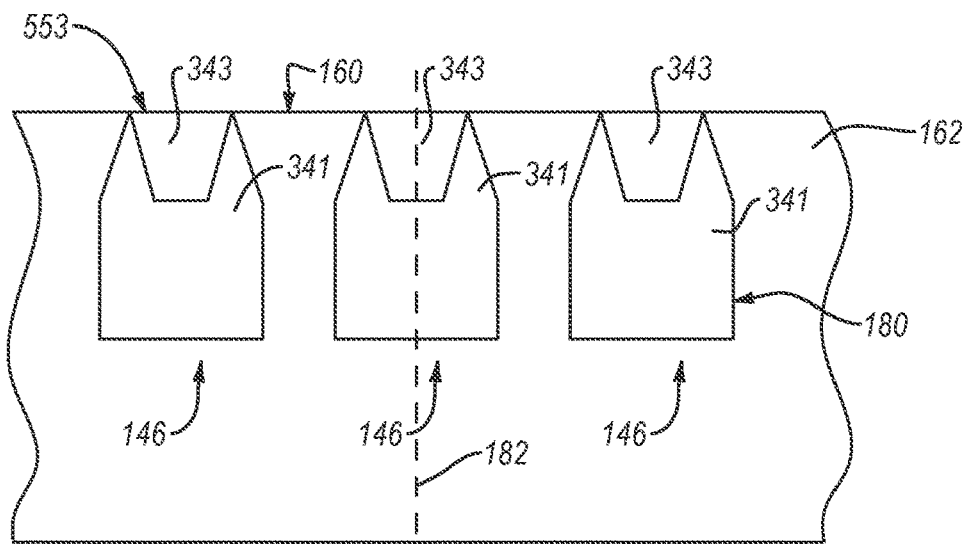
FIG. 6 is a front view of an electrical contact pad of a slider of a read-write head assembly, according to one or more examples of the present disclosure.

As shown in FIG. 5A, in a virtual plane 'A-B' substantially parallel to the suspension attachment side 162, the second portion 343 has a width that varies along a length l1 of the second portion 343. For example, the second portion 343 has a width that decreases from the second second-portion edge 553 to the first second-portion edge 551. The second portion 343 has a minimum width w2 and a maximum width w4. The first portion 341 also has a width that varies along a length l2 of the first portion 341. For example, a width of the first portion 341 increases along the length l2 in a first direction away from the non-head side 156 of the base 143. The first portion 341 has a minimum width, equal to the maximum width w4, and a maximum width w1. As shown in FIG. 5A, in some examples, the maximum width w4 of the second portion 343 is less than the maximum width w1 of the first portion 341. In some examples, both the maximum width w4 of the second portion 343 and the maximum width w1 of the first portion 341 are less than 0.01 millimeters ("mm"). In some examples, the maximum with w1 of the first portion 341 is greater than or equal to 0.035 mm.

As shown in FIGS. 5A-18, the first portion 341 does not have a constant width. For example, in FIG. 5A, the first portion 341 is tapered and has at least three different widths, w1, w2, and w3. This helps to reduce a contact area between the second portion 343 and the solder weldment 152 and increase a contact area between the first portion 341 and the solder weldment 152, which helps to improve signal strength and connectivity between the second electrical contact pad 146 and the first electrical contact pad 144.

As shown in FIG. 5B, in some examples, the second portion 343 includes a first second-portion edge 551 and a second second-portion edge 553. Each of the first second-portion edge 551 and the second second-portion edge 553 are substantially straight and parallel to one another. The first second-portion edge 551 is a free edge that is not in direct contact with the first portion 341. The first second-portion edge 551 is a cantilevered edge with respect to the first portion 341.

The second second-portion edge 553 is defined by a bend in the second electrical contact pad 146 and is also an edge of the first portion 341. The second second-portion edge 553 is fixed to the first portion 341 along a bend between the first portion 341 and the second portion 343. A distance between the first portion 341 and the second portion 343 increases from the second second-portion edge 553 to the first second-portion edge 551 along a length of the second portion 343. Because the second portion 343 protrudes away from the first portion at an angle θ, the first second-portion edge 551 is spaced apart from the first portion 341.

As shown in FIGS. 5A-18, in some examples, a width w2 of the second second-portion edge 553 is greater than a width w4 of the first second-portion edge 551. In some examples, the width w4 of the second second-portion edge 553 is the maximum width of the second portion 343, and the width w4 of the first second-portion edge 551 is the minimum width of the second portion 343.

A reduced area of the second portion 343 relative to the first portion 341 decreases contact between the solder weldment and the second portion 343 and increases contact area between the solder weldment and the first portion 341. As shown in FIG. 5B, in some examples, a portion 543d of the second portion 343 within a hypothetical square 560 is less than nine-tenths of a portion 541a of the first portion 341 that is within the hypothetical square 560. In some examples, the portion 543a of the second portion 343 within the hypothetical square 560 is less than half of the portion 541a of the first portion 341 within the hypothetical square 560. The hypothetical square 560 is substantially parallel to the virtual plane 'A-B' and to the suspension attachment side 162 of the base 143 and is projected onto the slider 142.

The hypothetical square 560 is defined by at least a first side 568, a second side 569, a third side 571, and a fourth side 573. The first side 568 of the hypothetical square 560 is substantially aligned with a first side 555 of the first portion 341. For example, the first side 568 of the hypothetical square 560 is an extension of the first side 555 of the first portion 341. The second side 569 of the hypothetical square 560 is perpendicular to the first side 555 of the first portion 341 and to the first side 568 of the hypothetical square 560. The second side 569 is aligned with the first second-portion edge 551. The third side 571 of the hypothetical square 560 is parallel to the second side 569 of the hypothetical square 560 and is aligned with the second second-portion edge 553 of the second portion 343.

Figure 11:
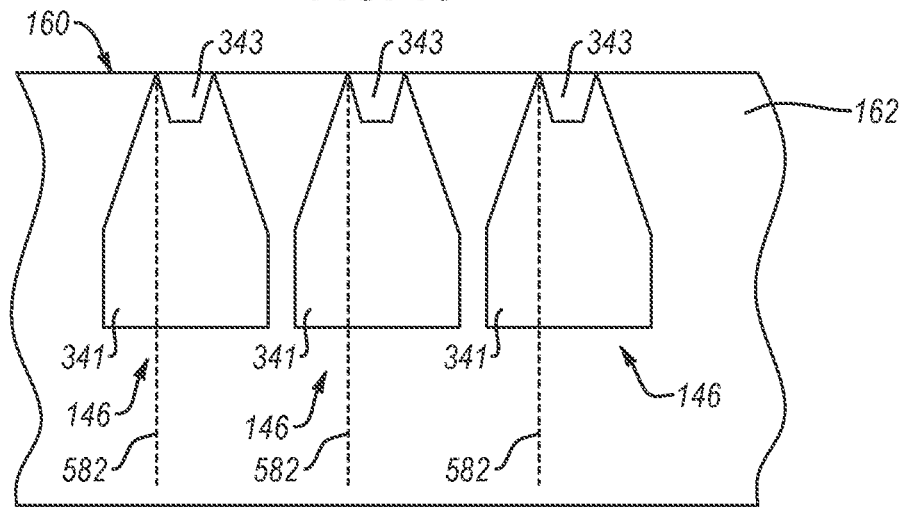
FIG. 11 is a front view of a slider of a read-write head assembly having an asymmetrical electrical contact pad, according to one or more examples of the present disclosure.
Figure 12:
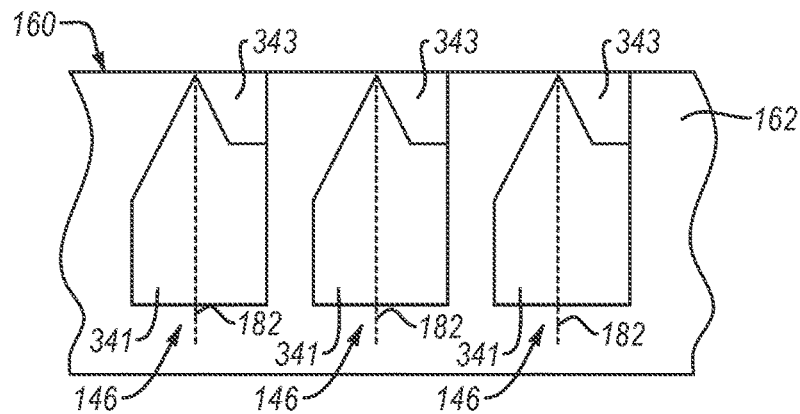
FIG. 12 is a front view of a slider of a read-write head assembly having an electrical contact pad with a substantially straight edge, according to one or more examples of the present disclosure.

In some examples, both the first portion 341 and the second portion 343 are substantially symmetrical about a center line 582 of the second electrical contact pad 146, as shown in FIGS. 5-8 and 13-18. In some examples, the second portion 343 is symmetrical about the center line 582, but the first portion 341 is asymmetrical about the center line 582, as shown in FIGS. 9-11. In some examples, both the second portion 343 and the first portion 341 are asymmetrical about the center line 582, as shown in FIG. 12.

Figure 7:
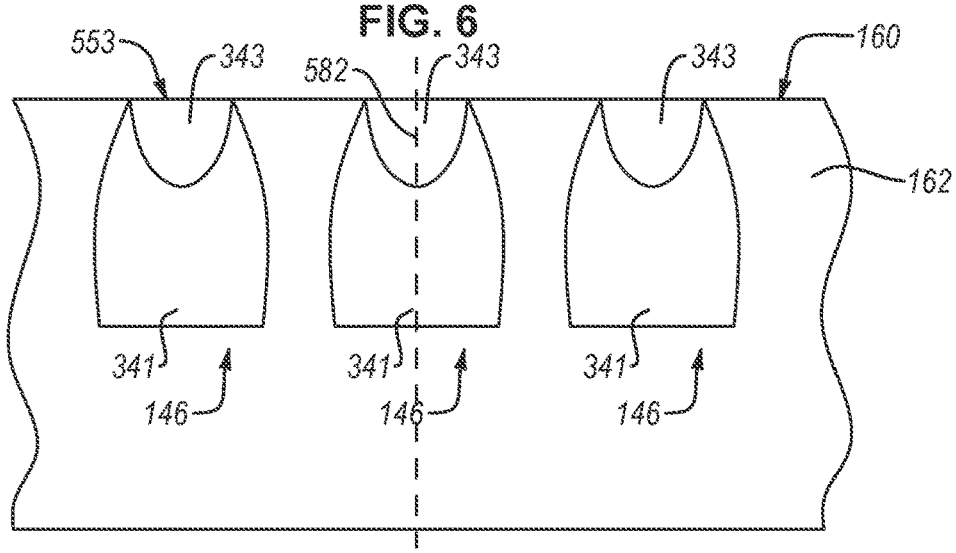
FIG. 7 is a front view of a slider of a read-write head assembly having a curved electrical contact pad, according to one or more examples of the present disclosure.

As shown in FIGS. 3-6, 8-13, and 15-18, in some examples, both the first portion 341 and the second portion 343 include substantially straight edges. As shown in FIGS. 5A-B, 6, 8-11, and 15-18, the second portion 343 is shaped substantially trapezoidal. As shown in FIGS. 7 and 14, in some examples, both the first portion 341 and the second portion 343 are at least partially curved. For example, as shown in FIG. 7, the second portion 343 has a semi-oval shape. As shown in FIG. 14, the second portion 343 is shaped semi-circularly.

Figure 13:
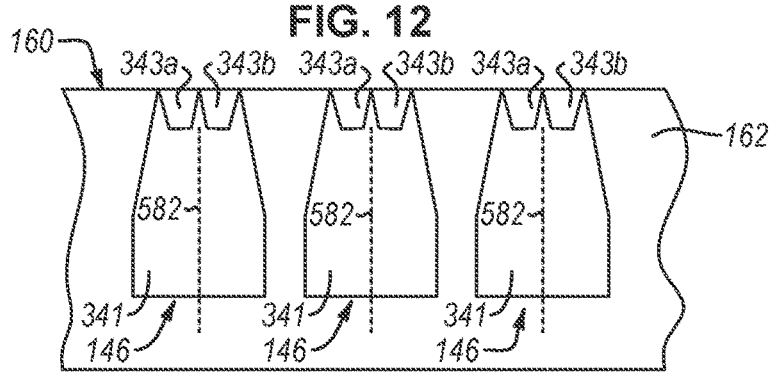
FIG. 13 is a front view of a slider of a read-write head assembly having an electrical contact pad with a first portion and two or more second portions protruding away from the first portion, according to one or more examples of the present disclosure.
Figure 14:
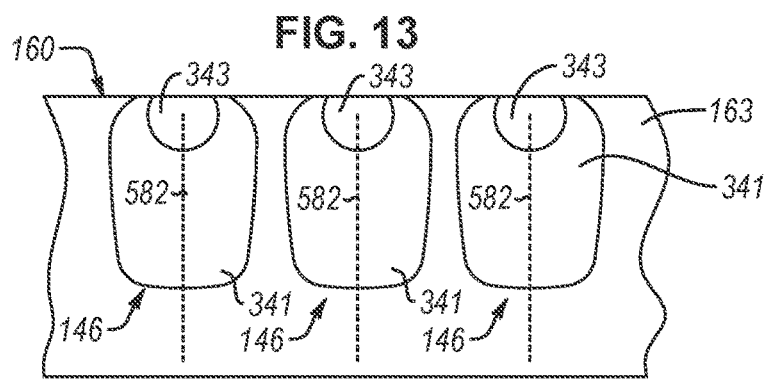
FIG. 14 is a front view of a slider of a read-write head assembly having an electrical contact pad with a first portion and a curved second portion, according to one or more examples of the present disclosure.

As shown in FIG. 13, in some examples, the at least one second electrical contact pad 146 includes two or more second portions 343a and 343b. Each of the second portions 343a and 343b share at least one edge 553. Each of the second portions 343a and 343b protrude from the first portion 341 away from the suspension attachment side 162 at an angle θ with respect to the first portion 341. In some examples, each of the second portions 343a and 343b protrude from the first portion 341 at different angles. For example, the second portion 343 includes two or more trapezoidal shaped portions 343a and 343b.

Figure 8:
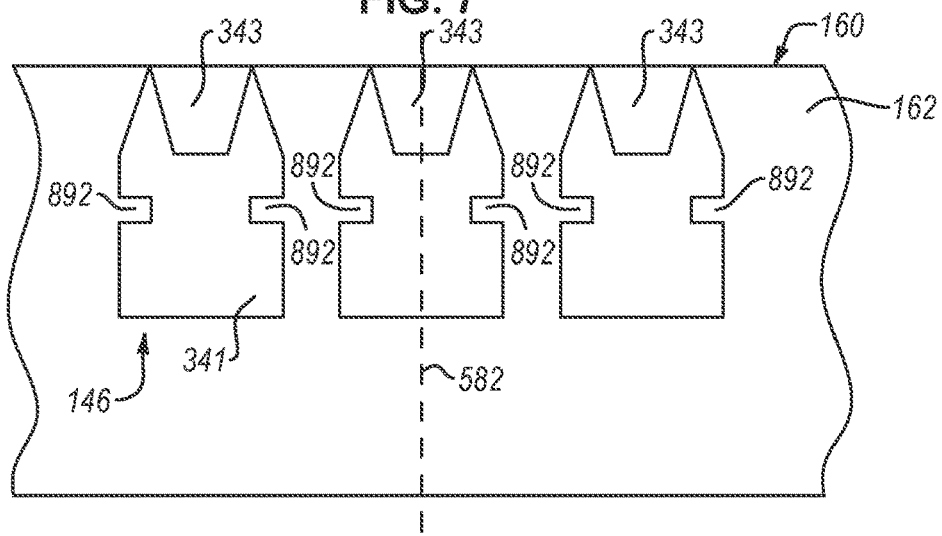
FIG. 8 is a front view of a slider of a read-write head assembly having an electrical contact pad with one or more slits, according to one or more examples of the present disclosure.
Figure 9:
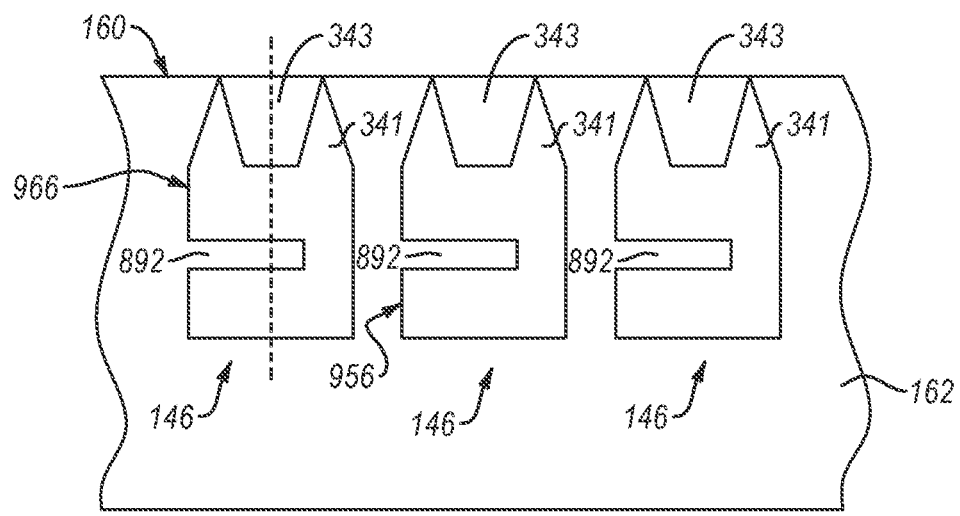
FIG. 9 is a front view of a slider of a read-write head assembly having an electrical contact pad with a slit, according to one or more examples of the present disclosure.
Figure 10:
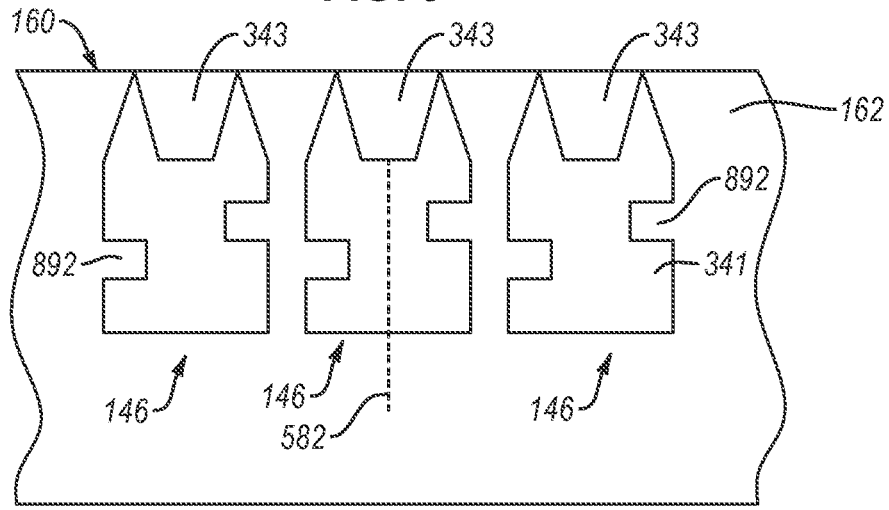
FIG. 10 is a front view of a slider of a read-write head assembly having an asymmetrical electrical contact pad with one or more slits, according to one or more examples of the present disclosure.

Referring to FIGS. 8-10, in some examples, the first portion 341 includes one or more slits 892. In some examples, the slits 892 are positioned on portions of the first portion 341 that are not likely to contact the solder weldment 152. The slits 892 can reduce material used for the second electrical contact pad 146, which can help to decrease weight of the slider 142. The slits 892 are positioned so as not to affect the shape of the second portion 343 when the second portion 343 is formed. For example, the slits 892 are positioned way from the location of the second edge 553 of the second portion 343. In some examples, the slits 892 are formed by etching. As shown in FIGS. 8 and 10, each one of the slits 892 extends from a side 956 of the first portion 341 and extends towards and/or intersects a center line 582. As shown in FIG. 9, in some examples, the first portion 341 includes only a single slit 892 as opposed to the multiple slits 892 shown in FIGS. 8 and 10.

As shown in FIGS. 15-18, in some examples, the second electrical contact pad 146 includes an anti-wetting layer 1502 that is disposed over at least the first portion 341. The anti-wetting layer 1502 is shaped and positioned so as not to interfere with contact between the solder weldment 152 and the first portion 341. The anti-wetting layer 1502 is applied before a reflow process and helps to control the flow of solder material during the reflow process. The anti-wetting layer 1502 is made of a material with low surface energy, which includes, for example, at least one of the following: fluorocarbons such as hydrogenated fluorocarbon ("HFC"), diamonds such as fluorine-doped diamond ("FDO"), polymers such as perfluoropolyether ("PFPE"), or any combination thereof.

Figure 15:
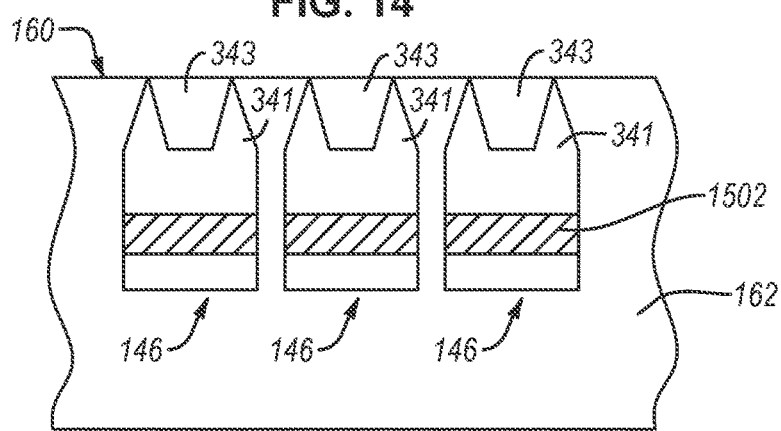
FIG. 15 is a front view of a slider of a read-write head assembly having an anti-wetting layer, according to one or more examples of the present disclosure.
Figure 16:
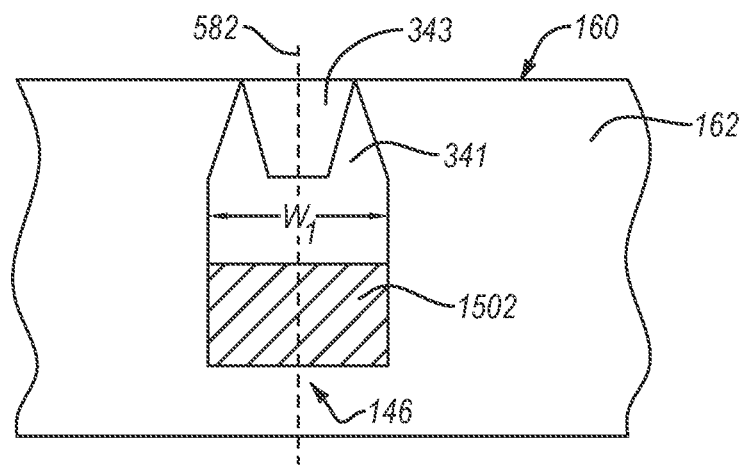
FIG. 16 is a front view of a slider of a read-write head assembly having an anti-wetting layer disposed over an electrical contact pad, according to one or more examples of the present disclosure.
Figure 17:
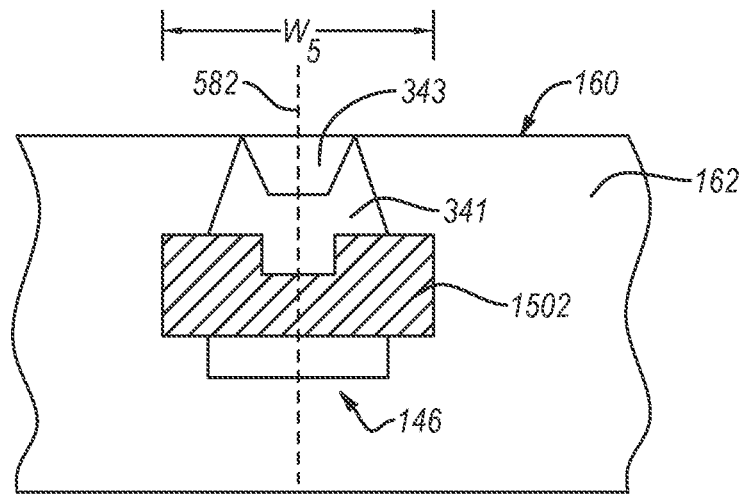
FIG. 17 is a front view of a slider of a read-write head assembly having an anti-wetting layer disposed over two edges of an electrical contact pad, according to one or more examples of the present disclosure.
Figure 18:
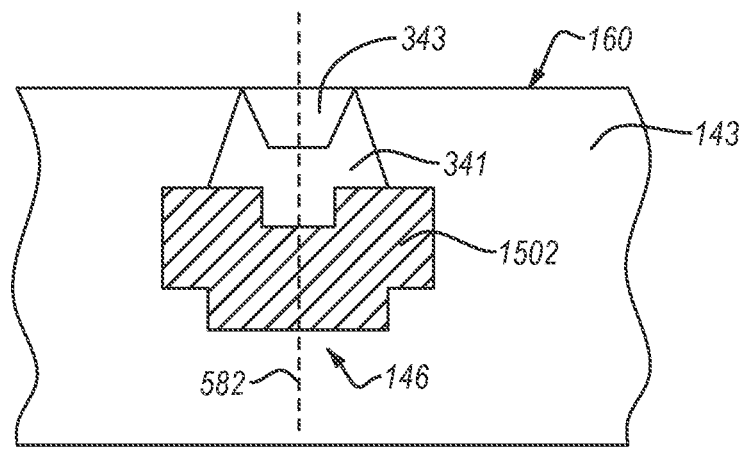
FIG. 18 is a front view of a slider of a read-write head assembly having an anti-wetting layer disposed over three edges of an electrical contact pad, according to one or more examples of the present disclosure.

As shown in FIGS. 15-18, the anti-wetting layer 1502 does not necessarily completely cover the first portion 341. In some examples, the anti-wetting layer 1502 has a maximum width equal to the maximum width w1 of the first portion 341. In other examples, as shown in FIGS. 17 and 18, the anti-wetting layer 1502 has a maximum width w5 that is greater than the maximum width w1 of the first portion 341.

Referring to FIG. 15, the anti-wetting layer 1502 is substantially rectangular in shape and extends transversely across the first portion 341. In some examples, the anti-wetting layer 1502 covers less than half of an area of the first portion 341. Referring to FIG. 16, the anti-wetting layer 1502 is substantially rectangular in shape. Referring to FIGS. 16 and 18, the anti-wetting layer 1502 covers at least a third of an area of the first portion 341.

The solder weldment 152 is made of any of various soldering materials. As shown in FIGS. 4A and 4B, the solder weldment can take the form of a solder ball. However, examples of the present disclosure are not so limited. In some examples, the solder weldment 152 is a solder fillet. In the case of a solder ball, in some examples, a radius R of the solder weldment 152 is more than the distance D2 between the non-head side 156 of the slider 142 and the second electrical contact pad 146. In this manner, the solder weldment 152 is less likely to contact the body of the slider 142 to cause an open connection. In one example, the radius R of the solder ball is equal to or less than about 40 μm.

As shown in FIG. 3, the slider 142 includes a plurality of second electrical contact pads 146 spaced apart from each other on the slider attachment side 162 of the base 143 in a direction parallel with the read-write surface 154. In one implementation, the slider 142 includes at least twelve second electrical contact pads 146 spaced apart from each other. In another implementation, the slider 142 includes at least thirteen electrical contact pads 146 spaced apart from each other. As shown in FIG. 3, the magnetic storage device 100 includes a plurality of solder weldments 152A. Each of the plurality of solder weldments 152A is similar to the solder weldment 152 and is coupled to a second electrical contact pad 146 of the plurality of second electrical contact pads 146. In one implementation, the magnetic storage device 100 includes at least twelve solder weldments 152A spaced apart from each other and each contacting a second electrical contact pad 146 of a plurality of second electrical contact pads 146 of the same slider 142.

In some examples, the suspension arm 140 includes a plurality of first electrical contact pads 144 spaced apart from each other in a direction a parallel with the read-write surface 154 and parallel to the direction along which the plurality of second electrical contact pads 146 are spaced. In one implementation, the suspension arm 140 includes at least twelve first electrical contact pads 144 spaced apart from each other.

Figure 19:
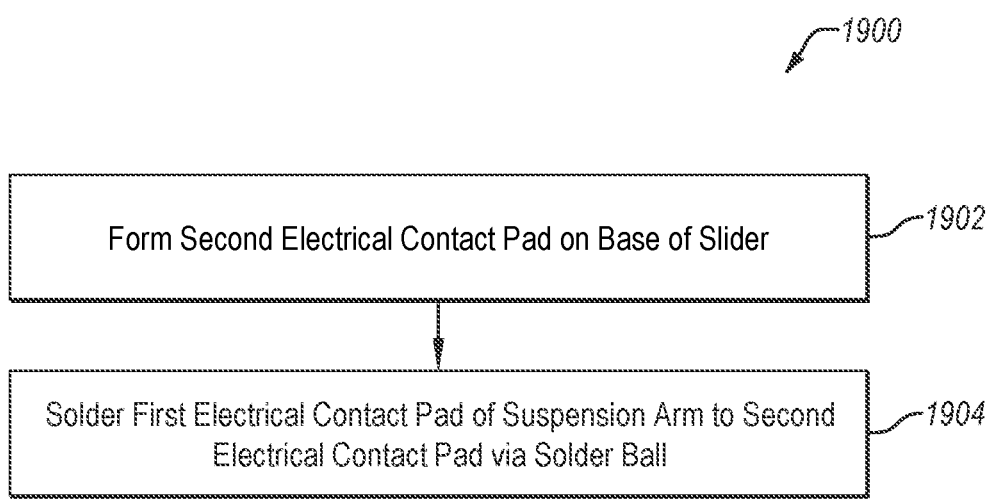
FIG. 19 is a schematic flow chart method of making an electrical contact pad of a magnetic storage device, according to one or more examples of the present disclosure.

Referring to FIG. 19, a method 1900 of making a magnetic storage device 100 includes forming 1902 at least one second electrical contact pad 146 on the base 143 of the slider 142. The second electrical contact pad 146 is formed 1902 onto the base 143 in a manner such that the first portion 341 has a width (e.g., w1 or w3) that is greater than a width of the second portion 343 of the second electrical contact pad 146 (e.g., w2 or w4). For example, the second electrical contact pad 146 is formed 1902 onto the base 143 in a substantially rectangular shape and subsequently etched into a more tapered shape, as shown in FIGS. 5, 6, 8-13, and 15-18. Alternatively, the second electrical contact pad 146 is etched into a curved shape, as shown in FIGS. 7 and 14. The second portion 343, or burr, that forms as a result of shaping the first portion 341 in such a way is affected by the shape of the first portion 341. For example, as shown in FIGS. 5, 6, 8-13, and 15-18, a first portion 341 with substantially straight edges results in a second portion 343 having a trapezoidal and/or triangular shape. As shown in FIGS. 7 and 14, a curved first portion 341 results in a curved second portion 343.

As a result of a complete method of making the magnetic storage device 100, the second portion 343 protrudes from the first portion away from the base 143 of the slider 142 at an angle $\theta$ with respect to the first portion 341 and the base 143 of the slider 142, as shown in FIG. 5B.

The method 1900 includes soldering 1904 at least one first electrical contact pad 144 of a suspension arm 140 to the at least one second electrical contact pad 146 of the slider 142 via at least one solder weldment 150 (such as a solder ball 150, as shown in FIGS. 5A-B). The solder weldment 150 reflows over at least a first portion 341 and at least part of the second portion 343 of the at least one second electrical contact pad 146.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Some of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A magnetic storage device, comprising:
   a magnetic disk;
   a carriage arm rotatably movable relative to the magnetic disk;
   a suspension arm co-movably fixed to the carriage arm, wherein the suspension arm comprises:
      a slider attachment side; and
      at least one first electrical contact pad on the slider attachment side;
   a slider co-movably fixed to the suspension arm, wherein the slider comprises:
      a base having a suspension attachment side, a non-head side facing the suspension arm and intersecting the suspension attachment side at a first slider edge of the base, and a head side opposite the non-head side and facing away from the suspension arm, wherein the suspension attachment side extends between the non-head side and the head side of the base; and
      at least one second electrical contact pad attached to the suspension attachment side of the base, and comprising:
         a first portion on the suspension attachment side of the base; and
         a second portion protruding from the first portion away from the suspension attachment side at an angle with respect to the first portion, and having a maximum width, in a virtual plane substantially parallel to the suspension attachment side, wherein the maximum width of the second portion is less than a maximum width of the first portion in the virtual plane;
   at least one solder weldment directly coupled to the at least one first electrical contact pad and the at least one second electrical contact pad; and
   a read-write head coupled to the head side of the base.

2. The magnetic storage device according to claim 1, wherein the second portion of the at least one second electrical contact pad further comprises a first second-portion edge and a second second-portion edge, wherein a portion of the second portion within a hypothetical square, parallel to the suspension attachment side of the base and projected onto the slider, is less than nine-tenths of a portion of the first portion within the hypothetical square, and wherein:

a first side of the hypothetical square is aligned with a first side of the first portion;
a second side of the hypothetical square is perpendicular to the first side and is aligned with the first second-portion edge of the second portion; and
a third side of the hypothetical square is parallel to the second side and is aligned with the second second-portion edge of the second portion.

3. The magnetic storage device of claim 2, wherein the portion of the second portion within the hypothetical square is less than half of the portion of the first portion within the hypothetical square.

4. The magnetic storage device of claim 1, wherein the solder weldment is further directly coupled to the first portion and the second portion of the at least one second electrical contact pad.

5. The magnetic storage device of claim 1, wherein:
a width of the first portion of the at least one second electrical contact pad varies along a length of the first portion; and
a width of the second portion of the at least one second electrical contact pad varies along a length of the second portion.

6. The magnetic storage device of claim 5, wherein:
the width of the first portion of the at least one second electrical contact pad increases along the length of the first portion in a first direction away from the non-head side of the base; and
the width of the second portion of the at least one second electrical contact pad decreases along the length of the second portion in the first direction away from the non-head side of the base.

7. The magnetic storage device of claim 5, wherein the first portion is symmetrical.

8. The magnetic storage device of claim 5, wherein the first portion is asymmetrical.

9. The magnetic storage device of claim 1, wherein:
the suspension arm comprises at least twelve first electrical contact pads on the slider attachment side;
the at least one first electrical contact pad comprises an electrical contact pad of the at least twelve first electrical contact pads;
the slider comprises at least twelve second electrical contact pads;
the at least one second electrical contact pad comprises an electrical contact pad of the at least twelve second electrical contact pads; and
the magnetic storage device comprises at least twelve weldments each directly coupled to corresponding ones of the at least twelve first electrical contact pads and the at least twelve second electrical contact pads.

10. The magnetic storage device of claim 1, wherein:
the second portion further comprises a first second-portion edge and a second second-portion edge;
the first second-portion edge is spaced apart from the first portion; and
the second second-portion edge adjoins the first portion along a bend between the first portion and the second portion.

11. The magnetic storage device of claim 10, wherein:
the first second-portion edge has a width, in the virtual plane, that is less than the maximum width of the second portion; and
a width of the second second-portion edge is equal to the maximum width of the second portion.

12. The magnetic storage device of claim 10, wherein the first second-portion edge is curved.

13. The magnetic storage device of claim 1, wherein the first portion comprises at least one slit extending from a side of the first portion toward a center line of the first portion.

14. A read-write head assembly for a magnetic storage device, comprising:
a suspension arm, wherein the suspension arm comprises:
a slider attachment side; and
at least one first electrical contact pad on the slider attachment side;
a slider co-movably fixed to the suspension arm, wherein the slider comprises:
a base having a suspension attachment side, a non-head side facing the suspension arm and intersecting the suspension attachment side at a first slider edge of the base, and a head side opposite the non-head side and facing away from the suspension arm, wherein the suspension attachment side extends between the non-head side and the head side of the base; and
at least one second electrical contact pad attached to the suspension attachment side of the base, and comprising:
a first portion on the suspension attachment side of the base; and
a second portion protruding from the first portion away from the suspension attachment side at an angle with respect to the first portion and having a maximum width, in a virtual plane substantially parallel to the suspension attachment side, wherein the maximum width of the second portion is less than a maximum width of the first portion in the virtual plane;
at least one solder weldment directly coupled to the at least one first electrical contact pad and the at least one second contact pad; and
a read-write head coupled to the head side of the base.

15. The read-write head assembly of claim 14, wherein the second portion has a semi-circular shape.

16. The read-write head assembly of claim 14, wherein the second portion has a trapezoidal shape.

17. The read-write head assembly of claim 14, wherein the at least one second electrical contact pad further comprises an additional second portion protruding from the first portion away from the suspension attachment side at an angle with respect to the first portion.

18. The read-write head assembly of claim 14, wherein the at least one second electrical contact pad further comprises an anti-wetting layer disposed over the first portion.

19. The read-write head assembly of claim 18, wherein the anti-wetting layer has a maximum width that is greater than the maximum width of the first portion.

20. A method of making a magnetic storage device, the method comprising:
forming at least one second electrical contact pad on a base of a slider so that:
a width of a first portion of the at least one second electrical contact pad is greater than a width of a second portion of the at least one second electrical contact pad; and
the second portion protrudes from the first portion away from the base of the slider at an angle with respect to the first portion and the base of the slider; and
soldering at least one first electrical contact pad of a suspension arm to the at least one second electrical contact pad of the slider via at least one solder ball so that the solder ball reflows over at least part of the first portion and at least part of the second portion of the at least one second electrical contact pad.

* * * * *